(12) United States Patent
Wilkening et al.

(10) Patent No.: US 9,539,780 B2
(45) Date of Patent: Jan. 10, 2017

(54) BICYCLE GLOVE WITH DIRECT-MOLDED PADDING

(71) Applicant: Specialized Bicycle Components, Inc., Morgan Hill, CA (US)

(72) Inventors: John Wilkening, Watsonville, CA (US); Carl D. Bird, Aptos, CA (US)

(73) Assignee: SPECIALIZED BICYCLE COMPONENTS, INC., Morgan Hill, CA (US)

(*) Notice: Subject to any disclaimer, the term of this patent is extended or adjusted under 35 U.S.C. 154(b) by 626 days.

(21) Appl. No.: 13/957,231

(22) Filed: Aug. 1, 2013

(65) Prior Publication Data

US 2015/0033441 A1 Feb. 5, 2015

(51) Int. Cl.
*B29D 99/00* (2010.01)
*A41D 19/015* (2006.01)
*A41D 19/02* (2006.01)
*A63B 71/14* (2006.01)

(52) U.S. Cl.
CPC ..... *B29D 99/0067* (2013.01); *A41D 19/01523* (2013.01); *A41D 19/02* (2013.01); *A63B 71/141* (2013.01)

(58) Field of Classification Search
CPC ..... A63B 71/148; A63B 71/146; A41D 19/00; A41D 19/01547; A41D 19/02
USPC .......... 2/161.1, 159, 161.3, 161.8, 167, 169
See application file for complete search history.

(56) References Cited

U.S. PATENT DOCUMENTS

| | | | | |
|---|---|---|---|---|
| 3,916,448 A | * | 11/1975 | Hamel | A41D 19/01505 2/16 |
| 5,003,638 A | * | 4/1991 | Miyake | A61L 31/10 2/161.6 |
| 5,557,803 A | * | 9/1996 | Granich | A41D 19/01523 2/16 |
| 5,581,809 A | * | 12/1996 | Mah | A41D 19/01523 2/161.1 |
| 5,896,584 A | * | 4/1999 | Hauser | A41D 13/082 2/159 |
| 6,052,827 A | * | 4/2000 | Widdemer | A63B 71/146 2/16 |
| 8,065,750 B2 | | 11/2011 | Dassler et al. | |
| 2009/0035524 A1 | | 2/2009 | Wyner et al. | |
| 2009/0044306 A1 | | 2/2009 | Lamson et al. | |
| 2011/0289643 A1 | | 12/2011 | Mazzarolo | |

* cited by examiner

*Primary Examiner* — Tejash Patel
(74) *Attorney, Agent, or Firm* — Michael Best & Friedrich LLP

(57) ABSTRACT

A method of making a glove includes placing a flexible material into a contoured mold, direct molding a resilient material (e.g., a thermoplastic elastomer) onto the flexible material while the flexible material is in the contoured mold, and securing the flexible material to other materials to create a glove. The resilient material can be applied in liquid form and at least partially solidified while in contact with the flexible material. Direct molding can include forming the resilient material into an anatomical shape and forming perforations in the resilient material. The method can be used to create a cycling glove including a palm panel having a flexible material, a resilient material formed into an anatomical shape and co-molded to the palm panel, and a back panel secured to the palm panel. The glove can further include a facing material attached to the flexible material with the resilient material sandwiched in between.

11 Claims, 6 Drawing Sheets

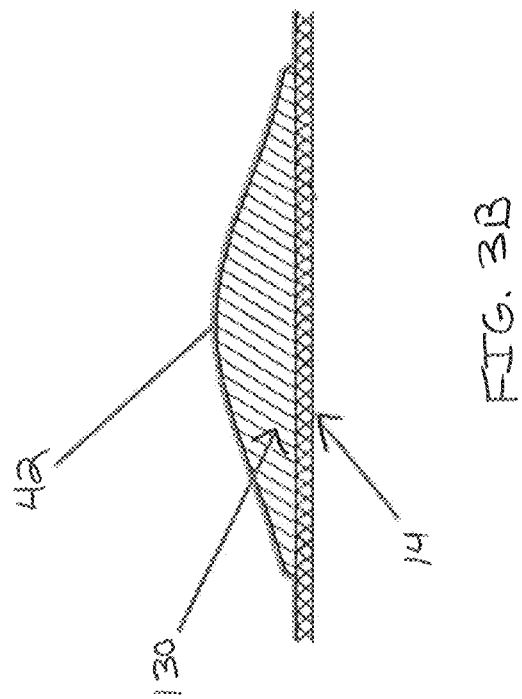
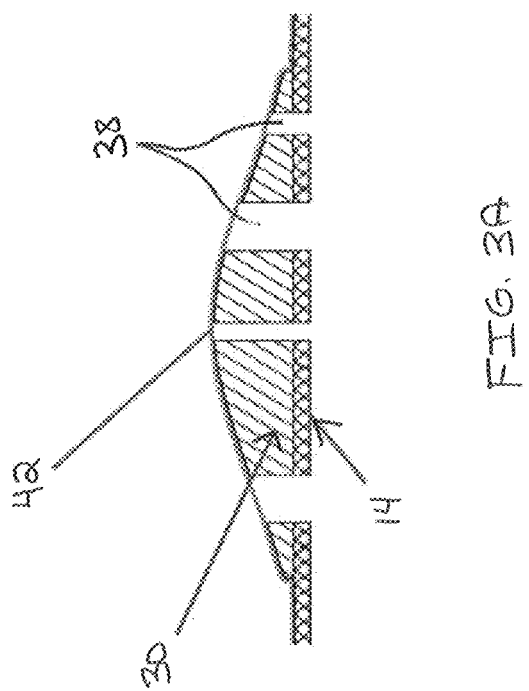

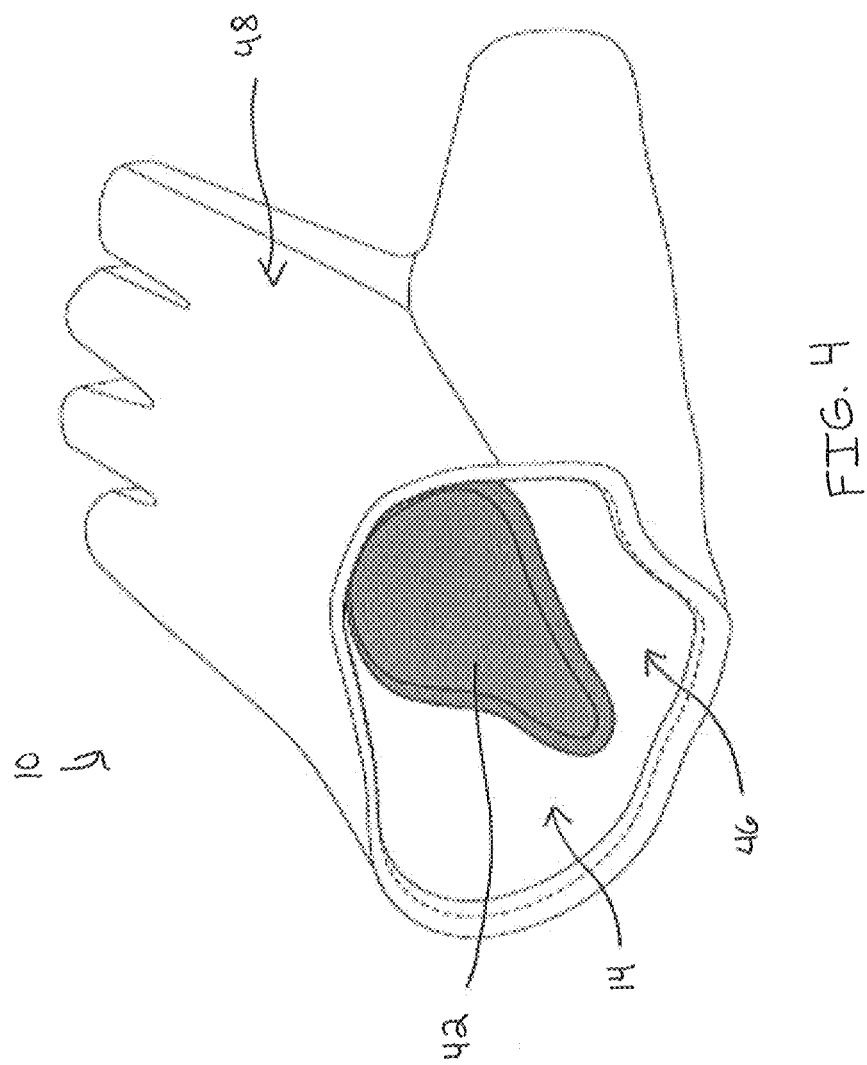

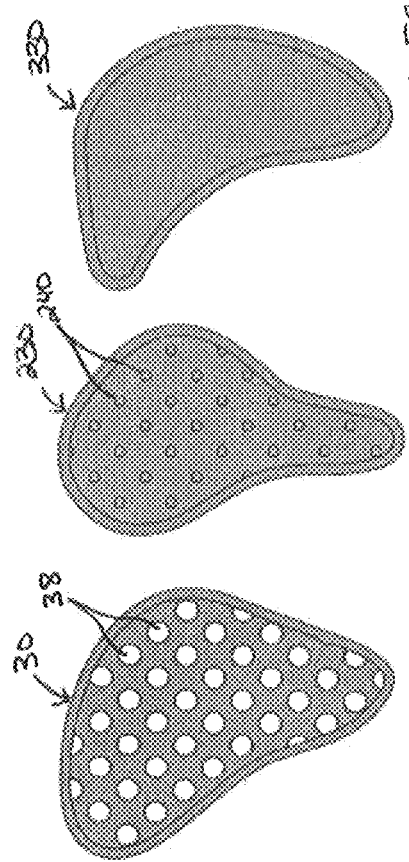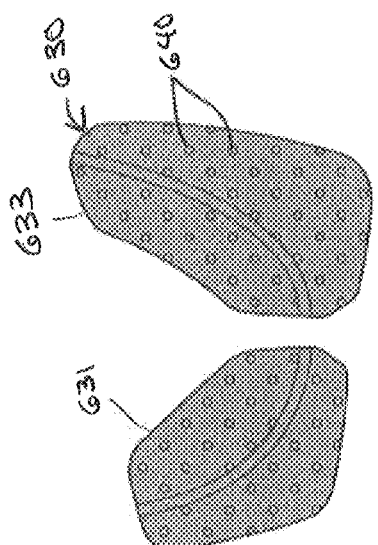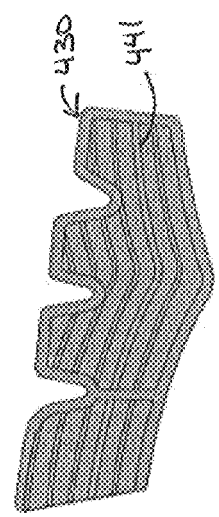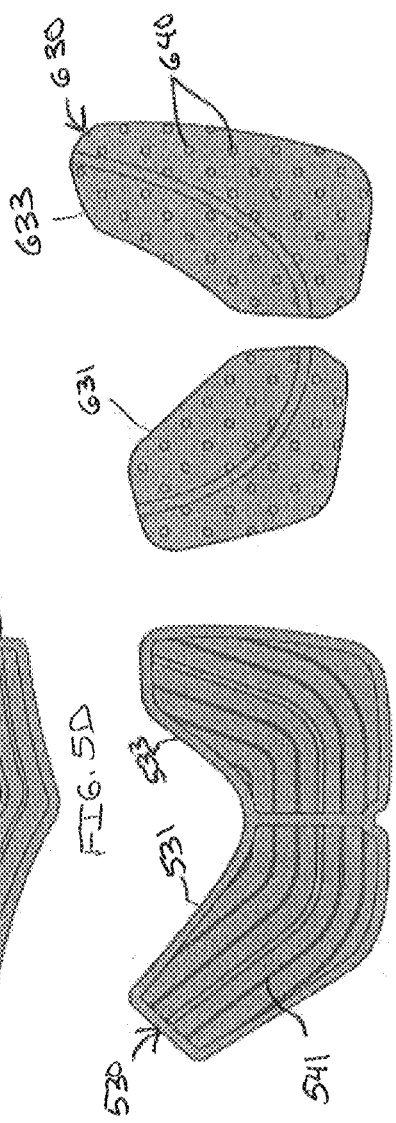

BICYCLE GLOVE WITH DIRECT-MOLDED PADDING

BACKGROUND

The present invention relates generally to the field of cycling gloves and specifically to padding applied to cycling gloves.

Cycling gloves typically are made of a flexible material, such as woven or stitch fabric, leather, polyurethane, or other suitable material. In order to provide protection for the rider's hands, cycling gloves are commonly provided with a resilient material or padding, such as foam, gel, or other suitable shock-absorbing material. The resilient material is typically sandwiched, adhered, or stitched into a pocket of the glove.

SUMMARY

The present invention provides a method of making a glove that includes placing a flexible material into a contoured mold, direct molding a resilient material (e.g., a thermoplastic elastomer) onto the flexible material while the flexible material is in the contoured mold, and securing the flexible material to other materials to create a glove. Direct molding can include applying the resilient material in liquid form into contact with the flexible material and at least partially solidifying the resilient material while it is in contact with the flexible material. The direct molding step can also include forming the resilient material into an anatomical shape and, optionally, forming perforations in the resilient material. If desired, the securing step can include attaching the flexible material to a facing material with the resilient material sandwiched in between the flexible material and the facing material. Preferably, the resilient material is secured in place substantially solely from its direct molding contact with the flexible material.

The invention also provides a cycling glove including a palm panel having a flexible material, a resilient material (e.g., a thermoplastic elastomer) formed into an anatomical shape and co-molded to the palm panel, and a back panel secured to the palm panel. In one embodiment, the resilient material comprises a thermoplastic elastomer (e.g., thermoplastic polyurethane or thermoplastic rubber) that preferably includes perforations. The glove can further include a facing material attached to the flexible material with the resilient material sandwiched in between the flexible material and the facing material.

Other aspects of the invention will become apparent by consideration of the detailed description and accompanying drawings.

BRIEF DESCRIPTION OF THE DRAWINGS

FIG. 3A is a cross-sectional view of the palm portion of FIG. 2, taken along lines 3A-3A in FIG. 2 and illustrating perforations.

FIG. 3B is an alternative cross-sectional view of a palm portion, shown without perforations.

FIG. 4 is a perspective view of an assembled glove, illustrating resilient material arranged on an inside of the glove.

FIGS. 5A-F are top views of examples of different shapes and sizes of resilient material for use in a glove.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
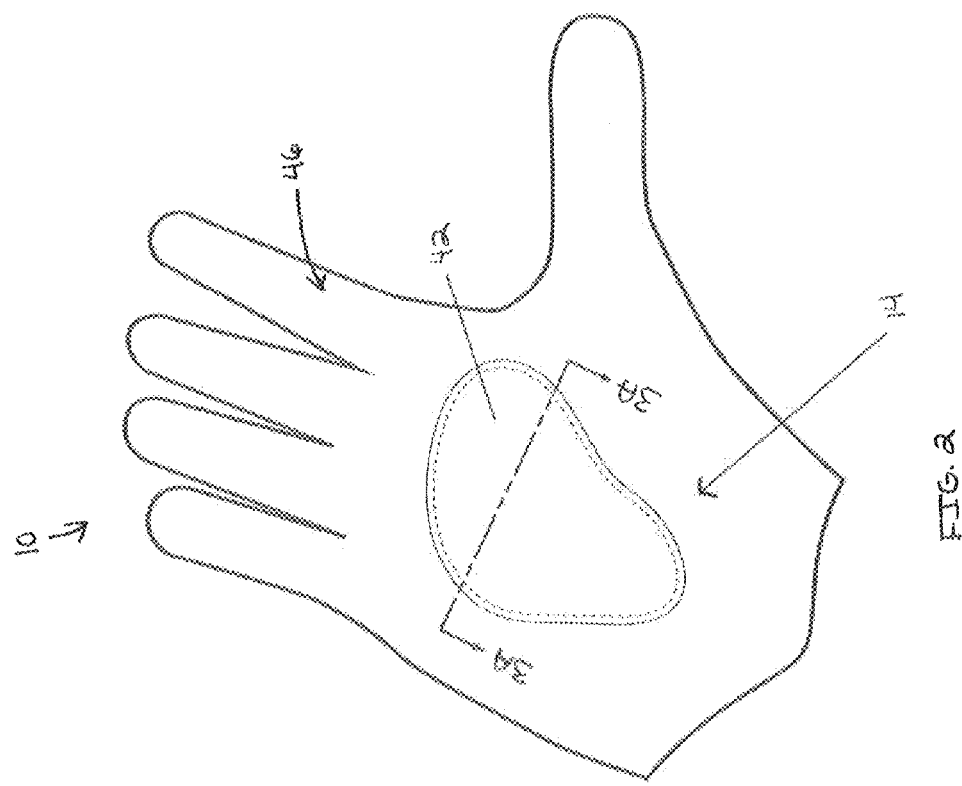
FIG. 1 is an exploded, perspective view of a first part of a direct molding process for making a glove according to one construction of the invention.
Figure 2:
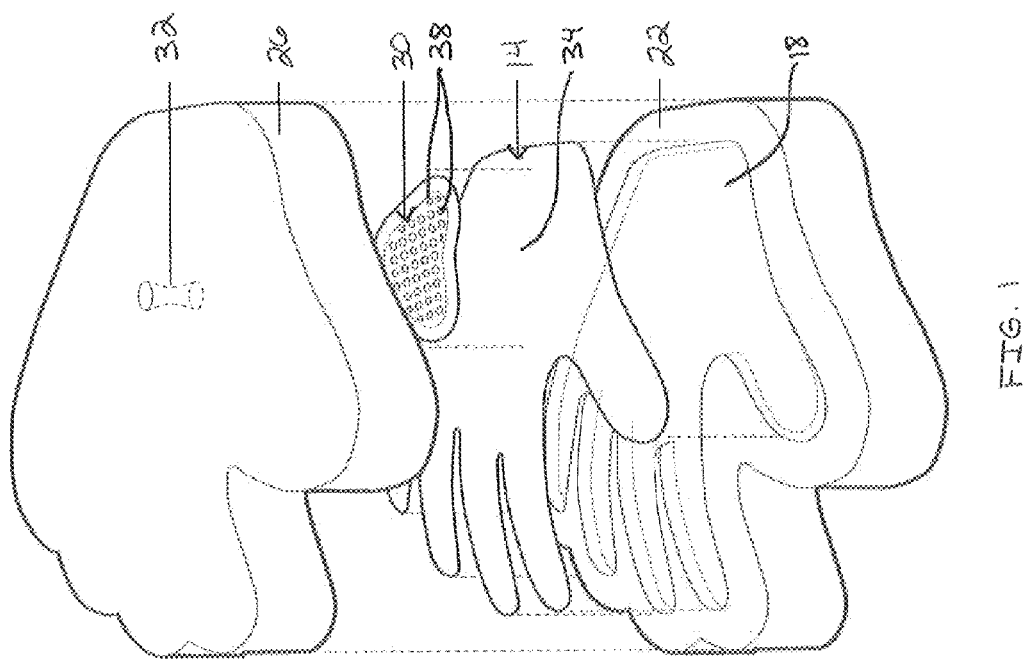
FIG. 2 is a top view of a second part of the direct molding process of FIG. 1, illustrating a palm portion of the glove.

With reference to FIGS. 1 and 2, the illustrated method of making a bicycle glove 10 includes inserting a flexible material 14 into a cavity 18 of a first contoured mold part 22, and closing a second contoured mold part 26 over the first mold part 22. The flexible material 14 inside the first and second mold parts 22, 26 starts out as a sheet of material, a portion of which is molded by the specially shaped mold parts 22, 26 into the anatomical shape of a hand and then trimmed into the palm panel shape shown in FIGS. 1 and 2 after removal from the mold. The illustrated flexible material 14 is woven or stitch fabric, leather, polyurethane, or other suitable material.

With continued reference to FIG. 1, after the mold parts 22, 26 are closed around the flexible material 14, a resilient material 30 is co-molded directly onto the flexible material 14. The resilient material 30 is molded by applying the resilient material 30 in liquid form into contact with the flexible material 14 through a mold opening 32 on the mold part 26, and at least partially solidifying the resilient material 30 while the resilient material 30 is in contact with the flexible material 14. The resilient material 30 forms a direct molded palm pad. The resilient material 30 is secured in place primarily from its direct molding contact with the flexible material 14. More specifically, the resilient material 30 is secured in place substantially solely from its direct molding contact with the flexible material 14 and without the need for additional securement, such as with adhesive, stitching, or a pocket.

The resilient material 30 is generally isolated in a central area 34 of the flexible material 14 during the molding process. The illustrated resilient material 30 is a thermoplastic elastomer such as a thermoplastic polyurethane or thermoplastic rubber, though other constructions of glove 10 use different materials for resilient material 30, such as ethylene vinyl acetate (EVA), foam, gel, or other suitable shock-absorbing or padding material.

As the resilient material 30 is directly molded onto the flexible material 14, the shape and size of the resilient material 30 is controlled so that the resilient material 30 is formed into an anatomical shape that complements the palm of a human hand, and provides anatomical padding for the hand. The resilient material 30 is formed into a shape that provides comfort and support for the user of a bicycle, and that enhances the ability of a user to maintain a grip on a bicycle handlebar. As illustrated in FIGS. 1 and 3A, the resilient material 30 includes perforations 38 that provide ventilation and flexibility to the solidified resilient material 30, as well as affect (e.g., lower) the overall durometer of the solidified resilient material 30 and impact a cushioning effect of the solidified resilient material 30. As illustrated in FIG. 3A, the perforations 38 extend through the flexible material 14, though in other constructions the perforations 38 extend only through the resilient material 30. In some constructions, and as illustrated in FIG. 3B, a resilient material 130 includes no perforations.

With reference to FIGS. 2 and 3A, after the resilient material 30 is molded to the flexible material 14, a facing material 42 is coupled to the flexible material 14. The facing material 42 is attached to the flexible material 14 over the resilient material 30. The illustrated facing material 42 is a thin, low-abrasion fabric cloth, such as tricot, though other constructions of the bicycle glove 10 use different materials for the facing material 42, including but not limited to leather or polyurethane. As illustrated in FIG. 3A, the facing material 42 is sewn directly to the fabric material 14 around the resilient material 30, and covers the resilient material 30, such that the resilient material 30 is sandwiched in between the flexible material 14 and the facing material 42. In other constructions the facing material 42 is coupled to the flexible material by adhesion or other coupling processes.

With reference to FIGS. 2, 3A, and 4, after the facing material 42 is coupled to the flexible material 14, the resulting combination of the flexible material 14, the resilient material 30, and the facing material 42 generally forms a palm portion 46 of the glove 10. The palm portion 46 is then coupled to one or more additional glove panels, such as a back panel 48 to form a completed structure (FIG. 4) for the glove 10. As illustrated in FIG. 4, the resilient material 30 is arranged on the inside of the glove 10, though in some constructions the resilient material 30 is arranged on an outside of the glove 10.

FIGS. 5A-F illustrate various examples of solidified resilient materials 30, 230, 330, 430, 530, and 630 for use with a glove. Each of the resilient materials 30, 230, 330, 430, 530, and 630 has a slightly different shape and size. The resilient material 230 of FIG. 5B includes divots 240 arranged in a pattern along the resilient material 230. The resilient material 330 of FIG. 5C includes no perforations or divots. The resilient material 430 of FIG. 5D is shaped and designed to fit within the region of a glove where a user's knuckles typically reside, to provide padding and support for the user's knuckles. The resilient material 430 includes lines or channels 441 that help provide added flexibility and affect the overall durometer of the solidified resilient material 430. The resilient material 530 of FIG. 5E includes two attached regions 531 and 533, and includes channels 541 similar to channels 441. The resilient material 630 of FIG. 5F includes two separated regions 631 and 633, along with divots 640 similar to divots 240. Other shapes and sizes of resilient material besides those shown in FIGS. 5A-F are also possible, as are different sizes, numbers, and/or arrangements of perforations and/or divots in the resilient material.

Figure 7:
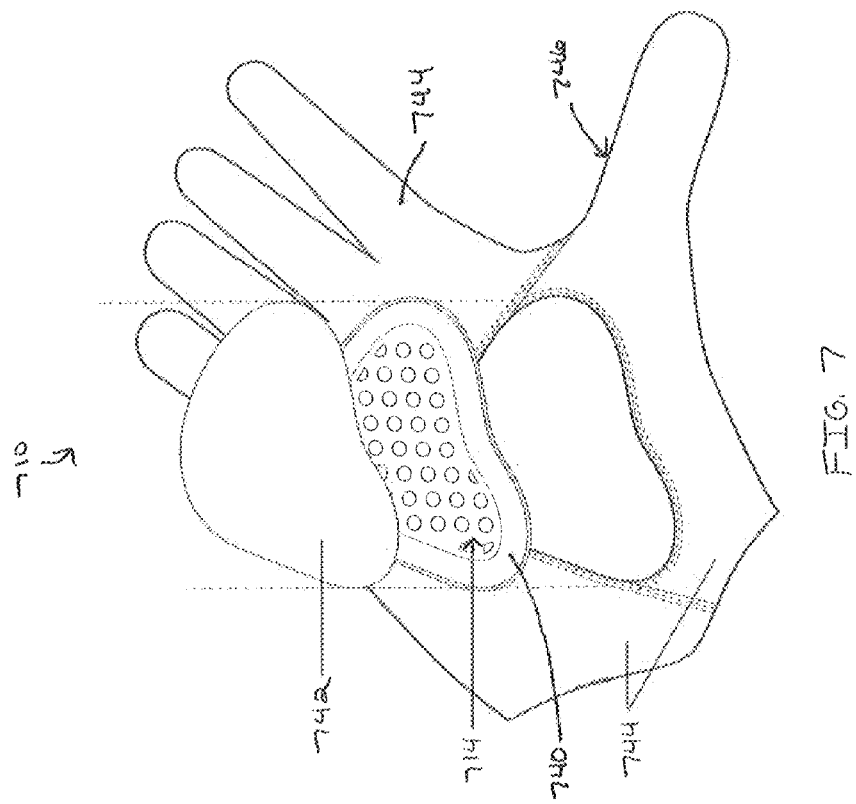
FIG. 7 is an exploded, perspective view of a second part of the direct molding process of FIG. 6.
Figure 6:
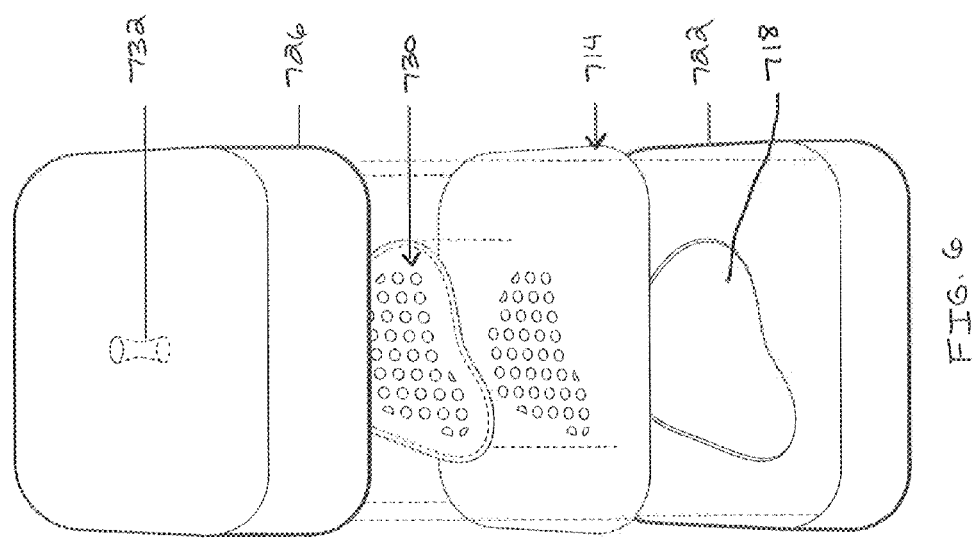
FIG. 6 is an exploded, perspective view of a first part of a direct molding process for making a glove according to another construction of the invention.

With reference to FIGS. 6 and 7, another method of making a glove 710 includes inserting a flexible material 714 into a cavity 718 of a first contoured mold part 722, and closing a second mold part 726 about the first contoured mold part 722. A resilient material 730 is directly co-molded by applying the resilient material 730 in liquid form into contact with the flexible material 714 through a mold opening 732 on the mold part 726, and at least partially solidifying the resilient material 730 while the resilient material 730 is in contact with the flexible material 714. The flexible material 714 inside the first and second mold parts 722, 726 is formed generally into a rectangular, or other non-anatomical shape, in contrast to the palm shape of resilient material 14 in FIGS. 1-4.

Figure 8:
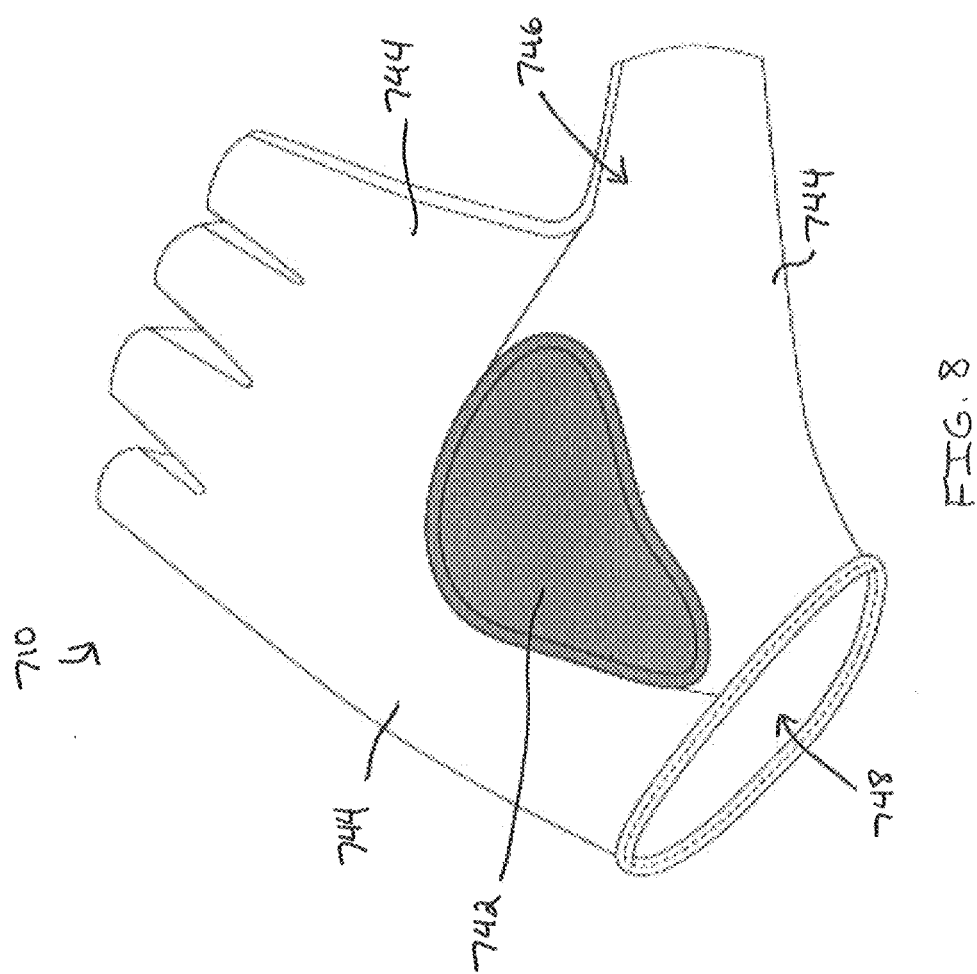
FIG. 8 is a perspective view of an assembled glove, illustrating resilient material arranged on an outside of the glove.

After the resilient material 430 is molded to the flexible material 714, the flexible material 714 is then cut. For example, and with reference to FIG. 7, the flexible material 714 is cut out around the resilient material 730, leaving a slight border 740 of flexible material 714 still surrounding the resilient material 730. Similar to the method illustrated in FIGS. 1-4, a facing material 742 is then coupled to the border 740. The combined flexible material 714, resilient material 730, and facing material 742 is then coupled, as an individual part, to one or more of a plurality of panels 744 sewn together (or otherwise coupled) to form an overall palm portion 746 for a glove 710. With reference to FIG. 8, the palm portion 446 is then coupled to one or more additional glove panels, such as a back panel 748, to form a completed structure for the glove 410. As illustrated in FIG. 8, the resilient material 730 is arranged on the outside of the glove 710, though in some constructions the resilient material 730 is arranged on an inside of the glove 710.

While the methods described above are described in the context of a bicycle glove 10, 710, the methods are equally applicable other types of gloves, as well as to socks or other pieces of clothing in which resilient padding may provide added comfort and user support.

Various features of the invention are set forth in the following claims.

The invention claimed is:

1. A method of making a cycling glove including glove material, the method comprising:
   placing a flexible material into a contoured mold;
   direct molding a resilient material onto the flexible material while the flexible material is in the contoured mold; and
   securing the flexible material to the glove material to create a glove.

2. A method of making a cycling glove as claimed in claim 1, wherein direct molding includes applying the resilient material in liquid form into contact with the flexible material.

3. A method of making a cycling glove as claimed in claim 2, wherein direct molding further includes at least partially solidifying the resilient material while it is in contact with the flexible material.

4. A method of making a cycling glove as claimed in claim 1, wherein direct molding includes forming the resilient material into an anatomical shape.

5. A method of making a cycling glove as claimed in claim 1, wherein direct molding includes forming perforations in the resilient material.

6. A method of making a cycling glove as claimed in claim 1, wherein the resilient material comprises a thermoplastic elastomer.

7. A method of making a cycling glove as claimed in claim 6, wherein the thermoplastic elastomer comprises at least one of thermoplastic polyurethane, thermoplastic rubber, and injected EVA.

8. A method of making a cycling glove as claimed in claim 1, wherein the securing step occurs after the direct molding step.

9. A method of making a cycling glove as claimed in claim 1, wherein the securing step includes attaching the flexible material to a facing material with the resilient material sandwiched in between the flexible material and the facing material.

10. A method of making a cycling glove as claimed in claim 1, wherein the resilient material is secured in place primarily from its direct molding contact with the flexible material.

11. A method of making a cycling glove as claimed in claim 1, wherein the resilient material is secured in place substantially solely from its direct molding contact with the flexible material.

* * * * *